(12) United States Patent
Wycech

(10) Patent No.: US 11,285,650 B2
(45) Date of Patent: Mar. 29, 2022

(54) PELLET BASED TOOLING AND PROCESS FOR BIODEGRADABLE COMPONENT

(71) Applicant: Joseph Wycech, Grosse Pointe Shores, MI (US)

(72) Inventor: Joseph Wycech, Grosse Pointe Shores, MI (US)

( * ) Notice: Subject to any disclaimer, the term of this patent is extended or adjusted under 35 U.S.C. 154(b) by 419 days.

(21) Appl. No.: 14/462,835

(22) Filed: Aug. 19, 2014

(65) Prior Publication Data

US 2015/0011664 A1    Jan. 8, 2015

Related U.S. Application Data

(63) Continuation-in-part of application No. 14/211,701, filed on Mar. 14, 2014, now Pat. No. 10,131,072.

(Continued)

(51) Int. Cl.
*B29C 48/00* (2019.01)
*B29B 9/06* (2006.01)
(Continued)

(52) U.S. Cl.
CPC .............. *B29C 48/022* (2019.02); *B29B 9/06* (2013.01); *B29B 9/12* (2013.01); *B29C 48/0011* (2019.02); *C08J 9/0061* (2013.01); *C08J 9/16* (2013.01); *C08J 9/236* (2013.01); *C08J 9/32* (2013.01); *C08L 3/02* (2013.01); *B29B 2009/125* (2013.01); *B29B 2009/163* (2013.01); *B29K 2033/04* (2013.01); *B29K 2055/00* (2013.01); *B29K 2995/006* (2013.01); *C08J 2201/03* (2013.01); *C08J 2203/22* (2013.01);

(Continued)

(58) Field of Classification Search
CPC ......... B29C 47/0004; B29B 9/06; B29B 9/12; C08J 9/0061; C08J 9/236; C08J 9/16; C08J 2203/22; C08J 2303/12; C08J 2303/04

See application file for complete search history.

(56) References Cited

U.S. PATENT DOCUMENTS 3,655,034 A    4/1972   Stollman et al.
3,670,064 A    6/1972   Edwards et al.
(Continued)

FOREIGN PATENT DOCUMENTS

DE    4228779    3/1994
EP    0696612    2/1996
(Continued)

OTHER PUBLICATIONS

Gregorova et al., "Characterization of Different Starch Types for their Application in Ceramic Processing," Journal of the European Ceramic Society 26 (2006) 1301-1309. (Year: 2006).*

(Continued)

*Primary Examiner* — Hai Vo
(74) *Attorney, Agent, or Firm* — Carlson, Gaskey & Olds, P.C.

(57) ABSTRACT

An example starch-based material for forming a biodegradable component includes a mixture of a starch and an expansion additive. The starch has an amylose content of less than about 70% by weight. The expansion additive enhances the expansion and physical properties of the starch. A method of preparing a starch-based material is also disclosed and an alternate starch-based material for forming a biodegradable component is also disclosed.

8 Claims, 5 Drawing Sheets

Related U.S. Application Data

(60) Provisional application No. 61/867,187, filed on Aug. 19, 2013, provisional application No. 61/781,809, filed on Mar. 14, 2013.

(51) Int. Cl.
    *B29B 9/12*     (2006.01)
    *C08J 9/00*     (2006.01)
    *C08L 3/02*     (2006.01)
    *C08J 9/32*     (2006.01)
    *C08J 9/236*     (2006.01)
    *C08J 9/16*     (2006.01)
    *B29K 55/00*     (2006.01)
    *B29K 33/04*     (2006.01)
    *B29B 9/16*     (2006.01)

(52) U.S. Cl.
CPC ........ *C08J 2300/16* (2013.01); *C08J 2303/02* (2013.01); *C08J 2303/04* (2013.01); *C08J 2303/12* (2013.01); *C08J 2347/00* (2013.01); *C08J 2357/06* (2013.01); *C08J 2409/00* (2013.01)

(56) References Cited

U.S. PATENT DOCUMENTS

| | | | |
|---|---|---|---|
| 28,826 A | 5/1976 | Ladney, Jr. | |
| 4,626,288 A * | 12/1986 | Trzasko | C08B 31/04 106/206.1 |
| 4,653,362 A | 3/1987 | Gerber | |
| 4,735,761 A | 4/1988 | Lindenberger | |
| 4,828,115 A | 5/1989 | Wiegand et al. | |
| 4,830,219 A | 5/1989 | Siemann | |
| 4,885,317 A | 12/1989 | Thein et al. | |
| 5,300,333 A | 4/1994 | Wilkerson et al. | |
| 5,511,667 A | 4/1996 | Carder | |
| 5,580,624 A * | 12/1996 | Andersen | B01F 3/1214 428/220 |
| 5,641,068 A | 6/1997 | Warner | |
| 5,897,944 A | 4/1999 | Loercks et al. | |
| 5,958,549 A | 9/1999 | Jaegers et al. | |
| 5,965,080 A | 10/1999 | Ando et al. | |
| 6,007,830 A * | 12/1999 | Roulier | A61K 8/0212 424/401 |
| 6,083,586 A | 7/2000 | Andersen et al. | |
| 6,136,255 A | 10/2000 | Ando et al. | |
| 6,167,790 B1 | 1/2001 | Bambara et al. | |
| 6,299,969 B1 * | 10/2001 | Altieri | C08B 30/12 127/32 |
| 6,359,057 B1 * | 3/2002 | Li | C08K 3/38 524/557 |
| 6,440,354 B1 | 8/2002 | Takai et al. | |
| 6,494,704 B1 | 12/2002 | Andersen et al. | |
| 7,332,214 B2 | 2/2008 | Ozasa et al. | |
| 7,820,002 B2 | 10/2010 | Wycech | |
| 8,043,539 B2 | 10/2011 | Ozasa et al. | |
| 8,171,973 B2 | 5/2012 | Ganzer | |
| 8,835,537 B2 * | 9/2014 | Lampinen | C08L 3/06 524/9 |
| 9,011,749 B2 | 4/2015 | Wycech | |
| 2003/0107145 A1 | 6/2003 | Ozasa et al. | |
| 2003/0236371 A1 | 12/2003 | Wilson, Jr. et al. | |
| 2004/0065424 A1 * | 4/2004 | Mohan | D21H 21/54 162/164.1 |
| 2004/0217503 A1 | 11/2004 | Grinshpun | |
| 2005/0235445 A1 | 10/2005 | Wycech | |
| 2007/0203005 A1 | 8/2007 | Suzuki | |
| 2010/0204349 A1 * | 8/2010 | Inohara | B01J 13/14 521/56 |
| 2012/0064347 A1 * | 3/2012 | Kita | B01J 13/185 428/402.24 |
| 2012/0097685 A1 * | 4/2012 | Babinsky | B65D 81/3869 220/592.2 |
| 2013/0269570 A1 * | 10/2013 | Doane, Jr | C08K 7/28 106/215.3 |
| 2014/0265004 A1 | 9/2014 | Wycech | |
| 2015/0011664 A1 | 1/2015 | Wycech | |
| 2017/0305054 A1 | 10/2017 | Wycech | |

FOREIGN PATENT DOCUMENTS

| | | |
|---|---|---|
| GB | 1586482 | 3/1981 |
| GB | 2352230 | 7/1999 |
| JP | 02188204 | 7/1990 |

OTHER PUBLICATIONS

Video: Puff Extruder Cheese Ball Snack Puff Machine. Published to YouTube May 25, 2012. Retrieved Mar. 5, 2014 from https://www.youtube.com/watch?v=SUnBk1_nyuA.

Video: Cheese Curl Step #1-Extruder. Published to YouTube Jul. 26, 2009. Retrieved Mar. 5, 2014 from https://www.youtube.com/watch?v=Kc2XI7qilkc.

* cited by examiner

PELLET BASED TOOLING AND PROCESS FOR BIODEGRADABLE COMPONENT

CROSS-REFERENCE TO RELATED APPLICATIONS

This application claims priority to U.S. Provisional Application No. 61/867,187 filed on Aug. 19, 2013. This application is a Continuation-in-Part of U.S. patent application Ser. No. 14/211,701 filed on Mar. 14, 2014, which claims priority to U.S. Provisional Application No. 61/781,809 filed on Mar. 14, 2013.

BACKGROUND

This disclosure relates to biodegradable components and more particularly to the manufacture and forming of starch-based biodegradable components using biodegradable pellets, and tooling and processes for both starch-based biodegradable components and biodegradable pellets.

Polystyrene foam is known and used as a packaging material for shipping, household items, cars, and other areas of manufacture and transportation. For instance, polystyrene foam materials are used to prevent damage to manufactured items during transportation, as well as adding stability to packaging during the shipping process. Many times, these materials are made using pre-cut or sized blanks of foam and then cavitating the pre-cut blank. Other non-biodegradable materials are used for a variety of business, shipping, and household applications.

SUMMARY

An example starch-based material for forming a biodegradable component includes a mixture of a starch and an expansion additive. The starch has an amylose content of less than about 70% by weight. The expansion additive enhances the expansion and physical properties of the starch.

An example method of preparing a biodegradable material includes mixing an expansion additive with a starch to form a biodegradable material mixture. The expansion additive enhances the expansion and physical properties of the starch, and the starch has an amylose content of less than about 70% by weight.

A starch-based material for forming a biodegradable component includes a mixture having an amylose content of $X_1$ by weight and an expansion additive content of $X_2$ by weight, and a ratio of $X_1$ to $X_2$ is between about 2 and 60.

DETAILED DESCRIPTION

Figure 1:
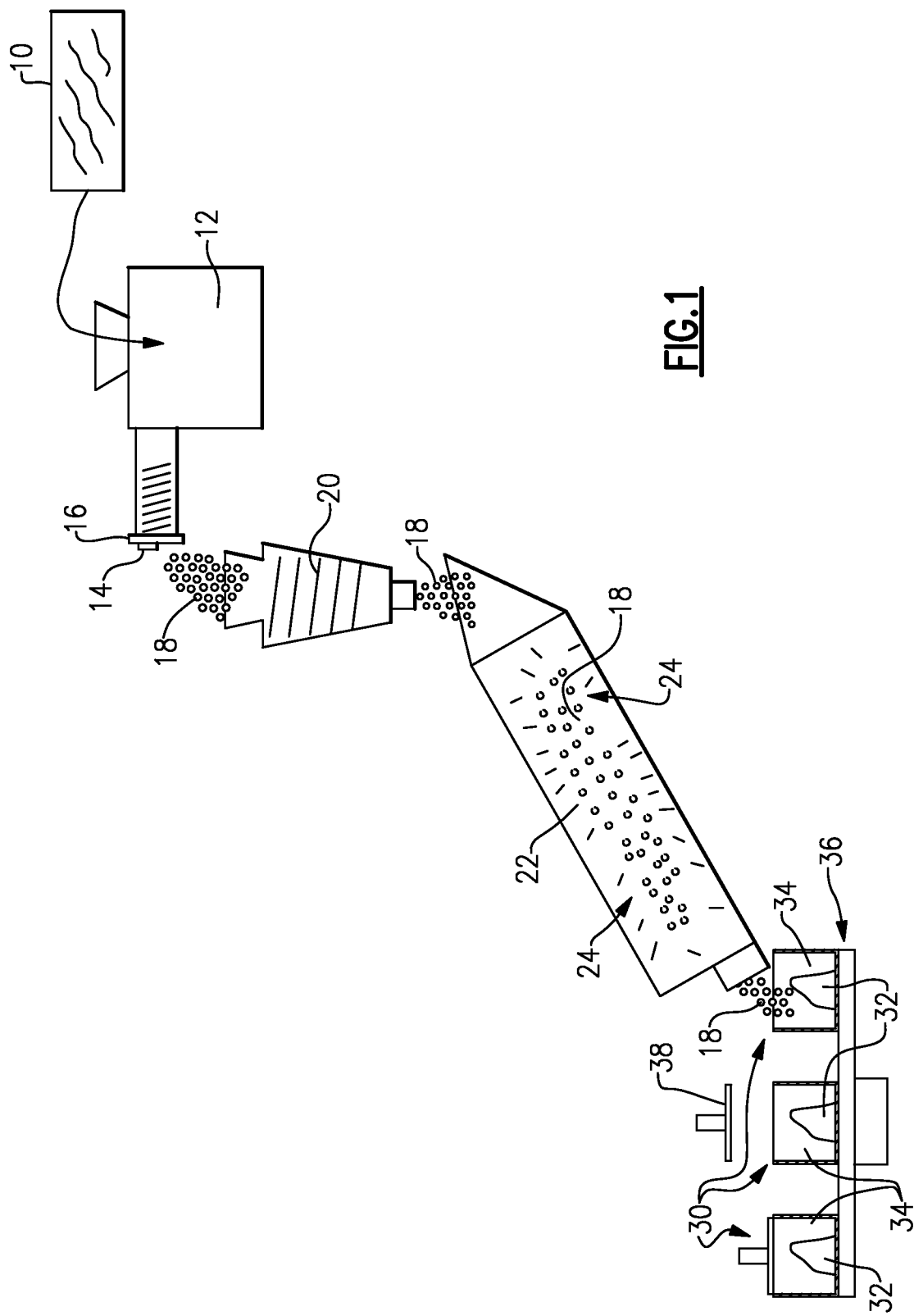
FIG. 1 is a perspective view of an example process and tooling to create biodegradable components.

Referring to FIG. 1, an example process, and corresponding tooling, to create biodegradable components and biodegradable pellets is shown. A starch-based biodegradable material 10, shown schematically, is provided. The starch-based biodegradable material 10 may include, for instance, corn starch or another type of processed or reclaimed starch. In one example, the starch-based material is dissolvable in water. In another example, the biodegradable material 10 is formed of a corn-based cellulosic material ("greencell") or other cellulose based material. In another example, the biodegradable material 10 is formed by providing starch flour with high amylose content and mixing the starch flour with water and additives. However, any biodegradable material may be used. ASTM International defines testing methods for determining whether a material is considered to be biodegradable.

In one example, the amylose content of the starch-based biodegradable material 10 is greater than 40% by weight and in further examples is between 55% and 75% by weight. The amylose acts as a blowing agent which allows the starch-based biodegradable material 10 to expand during processing to create a foam-like material during extrusion processing, as will be described below.

In a further example, an enhancing agent is added to the biodegradable material 10 in a dispenser such as an extruder 12, a cookie dispenser, or a positive displacement pump 12, or before the biodegradable material 10 is dispensed in the extruder, to enhance properties of the extruded biodegradable material 10 (in the form of biodegradable pellets 18 as will be described in further detail below). In one example, the material is a latex, peat, or glycerol. In another example, the material is an etherification additive such as an epoxide or hydroxyl ether. These materials enhance the flexibility and durability of the starch-based biodegradable material 10 when used with high-amylose content starches.

Low-amylose content starches such as potato starch may exhibit decreased expansion during processing. An example low-amylose content starch may contain between 20% and 30% by weight amylose. An additive material such as heat-expandable thermoplastic microspheres may be added to the starch to provide improved expansion, toughness, flexibility, and moisture resistance to the starch-based biodegradable material 10. These features provide for the use of a wider distribution of natural starch grain sizes in the starting starch material while producing a final product having the desired material characteristics. The heat-expandable thermoplastic microsphere may be a high elongation copolymer of acrylic which encapsulates a light gas contained in the microsphere upon extrusion. One example is EXPANCEL® (AkzoNobel Pulp and Performance Chemicals AB, Sundsvall, Sweden). The heat-expandable thermoplastic microspheres may be dry and either unexpanded or expanded prior to addition to the processed or reclaimed starch to form the starch-based biodegradable material. The unexpanded spheres may be sized from 45-120 microns.

The heat-expandable thermoplastic material may be added to the starch-based biodegradable material 10 in addition to or without other additives as described above. For instance, a primary additive such as the etherification additive or latex may be added in a greater amount than a minority additive such as heat-expandable thermoplastic microspheres. Alternatively, only the heat-expandable thermoplastic microsphere may be added to the starch-based biodegradable material 10.

The heat-expandable thermoplastic microsphere additive may be mixed with dry starch to provide a starch-based biodegradable material 10 having between 0.5% and 10% additive content by weight, in one example. In another example, the additive heat-expandable thermoplastic microspheres may be partially or fully expanded before mixing with the starch to form the starch-based biodegradable material 10. More particularly, the heat-expandable thermoplastic microsphere additive may be mixed with dry starch to provide a starch-based biodegradable material 10 having between 0.5% and 4% by weight expanded additive and between 1% and 5% by weight non-expanded additive.

In another example, the amylose content and additive are selected within a ratio on accordance with a desired expansion of the mixture. For example, the starch-based biodegradable material 10 has an amylose content of $X_1$ by weight and an expansion additive content of $X_2$ by weight, and a ratio of $X_1$ to $X_2$ is between about 2 and 60. In further examples, the ratio of $X_1$ to $X_2$ is between about 4 and 30 or between about 5 and 60 or between about 2 and 8.

The starch based biodegradable material 10 is provided to the dispenser. In one example, the dispenser is a heated mix extruder 12 which may be heated gradually from about 70° C. to about 200° C. along its length. However, other types of extruders may be used. In one example, water may be added to the starch-based biodegradable material 10 in the extruder 12 to form a gel in an amount between 15% and 30% of the weight of the starch. The extruder 12 is attached to a rotary cutter 14 and extrusion die 16 which are arranged to form a plurality of biodegradable pellets 18. In this example, the extruder 12 heats the biodegradable material 10 and forces the biodegradable material 10 through openings of the extrusion die 16. In one example, the extrusion die 16 includes openings between 2 and 5 mm in diameter. One or both of the extruder 12 and the extrusion die 16 are heated between 150° C. and 250° C.

The starch-based biodegradable material 10 emerges from the extrusion die 16 based on the geometry and arrangement of openings of the extrusion die 16. The biodegradable material 10 expands as it emerges from the extrusion die 16. As was described above, primary and/or minority additives aid the starch-based biodegradable material 10 in expanding. As the starch-based biodegradable material 10 is heated and forced through the extruder 12, the material 10 expands. Expansion of the starch-based biodegradable material 10 occurs primarily at the die 16. However, expansion can also occur before extrusion, within the extruder 12, or after extrusion. For example, additives such as thermoplastic heat-expandable microspheres may be added to the starch-based biodegradable material 10 in an expanded or unexpanded form, or in combination, prior to subjecting the starch-based biodegradable material to a cold extrusion process. After cold extrusion processing, the majority of expansion of the starch-based biodegradable material 10 occurs in a heated tool, such as a mold 30 described in more detail below.

The extruded starch-based biodegradable material 10 (in the form of biodegradable pellets 18 as will be described in further detail below) is thus a foam-like material that may include pockets which are open or closed. The degree of expansion is dependent on the mixing time in the extruder 12, the temperature in the extruder 12 and at the die 16, and the size and initial degree of expansion of additives such as thermoplastic heat-expandable microspheres.

The extruded biodegradable material 10 is cut by the rotary cutter 14, which moves about the face of the extrusion die 16, to form the plurality of biodegradable pellets 18. The size of the plurality of biodegradable pellets 18 are determined by the size of the extrusion die 16 opening, the rate of extrusion, and the RPM of the rotary cutter 14. The plurality of biodegradable pellets 18 may be uniformly or non-uniformly formed. The length of the extruded biodegradable material 10 is cut to equal the length of the desired biodegradable pellet 18. In one example, to form round biodegradable pellets 18, the length of the cut extrusion is equal to a diameter of the expanded extruded biodegradable material 10.

In this example, the plurality of biodegradable pellets 18 are formed using the extrusion process and tooling described above. In another example, the plurality of biodegradable pellets 18 are pre-formed by manufacture using an independent process or at a different location, and subsequently provided for further manufacture without the use of the above extrusion process and tooling.

The plurality of biodegradable pellets 18 are dispensed in a tumbler 20. The plurality of biodegradable pellets 18 are tumbled in the tumbler 20 to form the plurality of biodegradable pellets 18 having a round, oval, or elliptical geometry. However, other shapes of plurality of biodegradable pellets 18 are contemplated. In one example, the plurality of biodegradable pellets 18 are tumbled while still heated to assist forming of the plurality of biodegradable pellets 18. In another example, the biodegradable pellets 18 are not dispensed into a tumbler 20 and the round, oval, or elliptical geometry of the pellets 18 is formed directly by cutting with the rotary cutter 14 at the die 16 openings.

Round, oval, or elliptical shaped biodegradable pellets 18 provide a uniform surface for spray coating and are geometrically suitable for packing in a mold, as will be described in further detail below. Round, oval, or elliptical shaped biodegradable pellets 18 generally have less surface area than other geometric shapes to provide control of the amount of spray coating disposed on the plurality of biodegradable pellets 18 and prevent excessive absorption of spray coating.

In this example, the tumbler 20 is heated to a desired pre-determined temperature to shape the plurality of biodegradable pellets 18. The forming via heated tumbler 20 forms a shell on each of the plurality of biodegradable pellets 18.

The plurality of biodegradable pellets 18 are then disposed in a spray chamber 22. In another example, the plurality of biodegradable pellets 18 are sprayed without the use of spray chamber 22. The plurality of biodegradable pellets 18 are at a desired temperature when entering the spray chamber 22. The plurality of biodegradable pellets 18 are then sprayed in the spray chamber 22 with one or more binding agents 24.

In one example, the plurality of biodegradable pellets 18 are sprayed with a binding agent that is a natural oil or vegetable oil. The oil provides a water barrier or sealer for the plurality of biodegradable pellets 18.

In another example, the binding agent 24 is solid at room temperature and has a specific melt temperature above room temperature. The plurality of biodegradable pellets 18 are provided at room temperature, between 40° F. and 70° F. In one example, the binding agent is melted at a temperature of 135° F. and sprayed onto the plurality of biodegradable pellets 18. The plurality of biodegradable pellets 18 remain separated due to movement of the spray chamber 22. The plurality of biodegradable pellets 18 become tack free with continued movement of the spray chamber 22. The plurality of biodegradable pellets 18 are cooled in the spray chamber 22 and dispensed at room temperature.

Figure 2:
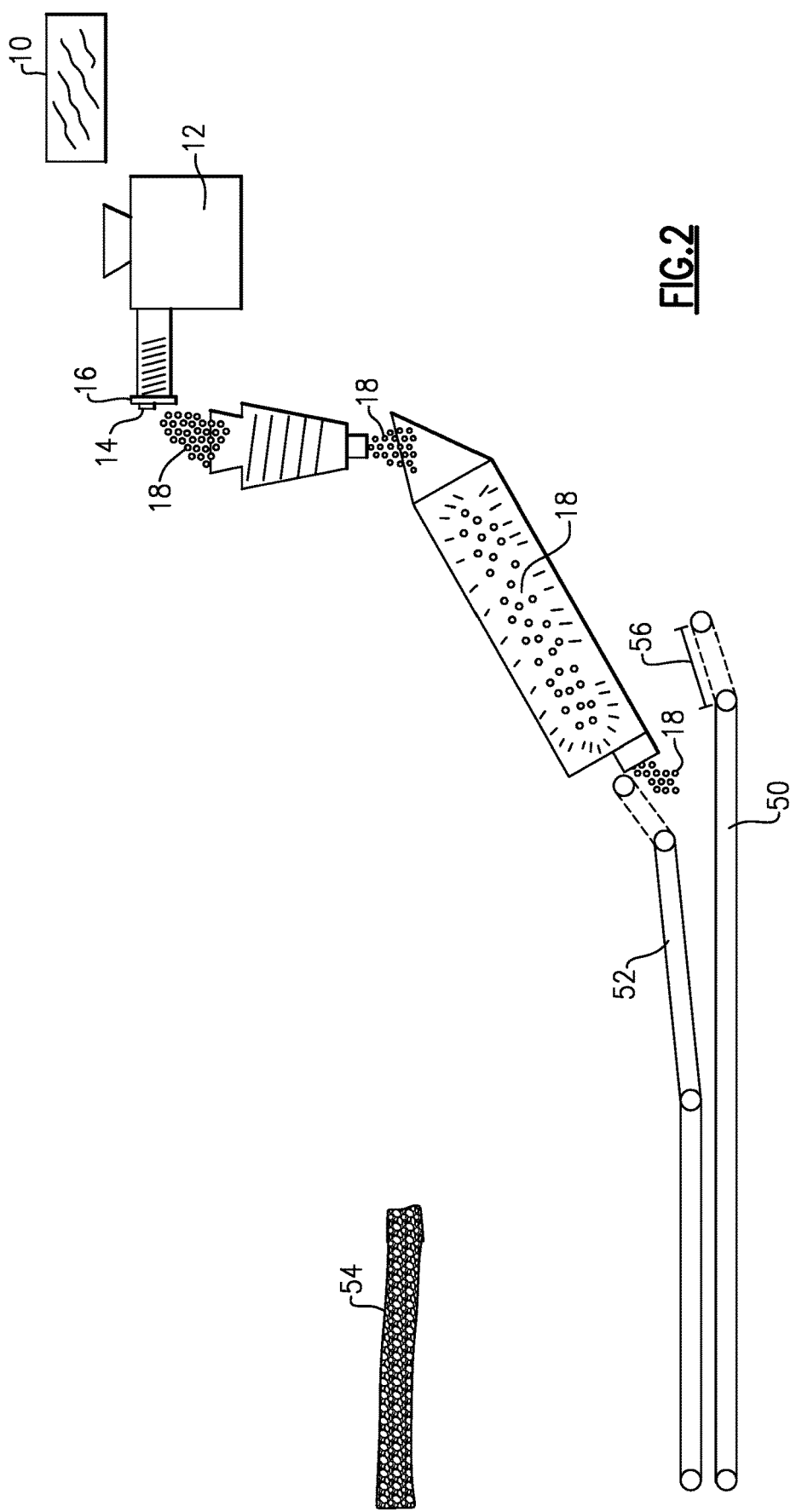
FIG. 2 is a perspective view of another example process and tooling to create biodegradable components.

In another example, the binding agent 24 is solid at room temperature and has a specific melt temperature above room temperature. The plurality of biodegradable pellets 18 are provided at a temperature above the melt temperature of the binding agent 24. In one example, the plurality of biodegradable pellets 18 are provided at a temperature of between 210° F. and 250° F. The binding agent 24 is melted at a temperature of 200° F. and is sprayed onto the plurality of biodegradable pellets 18. The plurality of biodegradable pellets 18 remain separated due to movement of the spray chamber 22, which is kept between 40° F. and 70° F. The plurality of biodegradable pellets 18 are cooled in the spray chamber 22 and dispensed at room temperature In another example, the binding agent 24 is liquid at room temperature. The plurality of biodegradable pellets 18 are frozen at or below 0° F., and generally at −150° F., but at a temperature below the freezing point of the liquid binding agent 24. In one example, the binding agent 24 is sprayed onto the plurality of biodegradable pellets 18 at a temperature of 35 to 60° F. The binder agent 24 freezes on contact with the plurality of biodegradable pellets 18. The plurality of biodegradable pellets 18 remain separated from each other due to the movement of the spray chamber 22. The coated plurality of biodegradable pellets 18 are dispensed frozen.

In another example, the binding agent 24 is water. The plurality of biodegradable pellets 18 are provided at or below 40° F. The binding agent 24 is sprayed onto the plurality of biodegradable pellets 18 and roll coated in the spray chamber 22.

In another example, the binding agent 24 is a low viscosity liquid at room temperature. The plurality of biodegradable pellets 18 are provided at room temperature. In one example, the binding agent 24 is water or a water based adhesive that is sprayed onto the plurality of biodegradable pellets 18 at room temperature until the plurality of biodegradable pellets 18 begin to adhere together. The plurality of biodegradable pellets 18 absorb the binding agent 24 such that the pellets are tack free after continued movement in spray chamber 22 and are dispensed at room temperature.

In one example, the binding agent 24 is a dry particle which is disposed on the plurality of biodegradable pellets 18 by spraying or shaking just after the application of a different binding agent 24. Application of dry particle binding agents 24 provide separation between the coated plurality of biodegradable pellets 18, reduction or increase in adhesion between the coated plurality of biodegradable pellets 18, and/or allows addition of color, fragrance, and/or anti-bacterial features to the coated plurality of biodegradable pellets 18.

In one example, the binding agent 24 is at least one of dextrin, starch based liquid adhesive, liquid soap, liquid glycerin soap, catalyzed room temperature or elevated cured liquid polyester, acrylic adhesive, urethane adhesive, epoxy adhesive, hot melt wax, solid glycerin bar soap, solid or water based epoxy, hot melt adhesive, aerobic adhesive, and/or other liquid that is sprayed or dispensed at room temperature or above. The solid glycerin bar soap is heated to a temperature at or below 150° F., the solid epoxy is heated to a temperature at or below 220° F., and the hot melt adhesive is heated to a temperature at or below 360° F. The liquid glycerin soap is heated to a temperature at or below 135° F. and the hot melt wax is heated to a temperature at or below 140° F. Combinations of the above binding agents 24 are contemplated in this disclosure.

One or more binding agents 24 may be provided alone, or in combination using any of the above described methods.

After the plurality of biodegradable pellets 18 are coated with binding agent 24 in spray chamber 22, the plurality of biodegradable pellets 18 are dispensed in at least one mold 30 to form a component. Mold 30 may be heated to between 110° C. and 200° C., in one example. Heating of mold 30 may be provided by electric rods or coils, steam or hot air injection, microwave, or radio frequency heating. Expansion of the biodegradable pellets 18 may continue after the pellets 18 have been dispensed into the mold 30. Mold 30 may include one or more male parts 32 and female parts 34. The male parts 32 and female parts are three dimensional and formed based on a component to be shipped (not shown) or other desired shape. In this example, the plurality of biodegradable pellets 18 are dispensed based on at least one of weight or volume.

In one example, a plurality of molds 30 are disposed on a carousel 36 such that a plurality of molds 30 are rotated and provided with the plurality of biodegradable pellets 18 without adjusting the source of the plurality of biodegradable pellets 18. In this example, the number of molds 30 in the plurality of molds 30 is determined based on the number of biodegradable pellets 18 necessary for each mold 30, the type of binding agent 24, and the time necessary for the plurality of biodegradable pellets 18 to settle, possibly expand, and adhere to one another in each mold 30.

In this example, the plurality of biodegradable pellets 18 are compressed in the mold 30 to form the component having performance characteristics based on one or more of the finished size of each of the plurality of biodegradable pellets 18, the finished stiffness of each of the plurality of biodegradable pellets 18, the binding agent 24 used, the finished surface porosity of each of the plurality of biodegradable pellets 18, the presence of a sealing shell on each of the plurality of biodegradable pellets 18, the thickness of the sealing shell, and/or the density of biodegradable pellets 18 within a given thickness of the component.

In one example, the plurality of biodegradable pellets 18 are compressed in the mold 30 using a compression plate 38. The compression plate 38 remains in place until the plurality of biodegradable pellets 18 form a component.

In one example, the molds 30 are heated by electric rods or coils, steam or hot air injection, microwave, or radio frequency heating to further aide adhesion of the plurality of biodegradable pellets 18 to one another. The density of the component is determined based on the compression of the plurality of biodegradable pellets 18, the density of the pellets 18 entering the mold 30, time in the mold 30, the heat applied by the mold 30, and the amount of pellet 18 expansion in the mold.

In one example, an adhesive, soap, glue or other material is provided in the mold 30 with the plurality of biodegradable pellets 18 to form the component.

Once the component is formed, the component may be removed from the mold 30 using ejector pins (not shown) or removal of portions of the mold 30 to allow the component to be retrieved.

The component formed using the above process and tooling has enhanced strength and moisture resistance because stress cracks are forced to follow irregular paths afforded by the plurality of biodegradable pellets 18 engaged with each other.

Referring to FIG. 2, another example process, and corresponding tooling, to create biodegradable components and biodegradable pellets is shown. The process and tooling of FIG. 2 includes all of the features of the process and tooling of FIG. 1, except that FIG. 2 includes a first conveyor belt 50 and second conveyor belt 52 in place of carousel 36 and molds 30.

In this example, the first conveyor belt 50 and second conveyor belt 52 are spaced apart. The plurality of biodegradable pellets 18 are dispensed onto the first conveyor belt 50, between the first conveyor belt 50 and second conveyor belt 52. The first conveyor belt 50 and second conveyor belt 52 are temperature controlled to provide heat by electric rods or coils, steam or hot air injection, microwave, or radio frequency heating, as needed, to the plurality of biodegradable pellets 18. The first conveyor belt 50 and second conveyor belt 52 compress the plurality of biodegradable pellets 18 to form a single thickness plank 54 of biodegradable material. Expansion of the pellets 18 can also occur between the first and second conveyor belts 50, 52.

In one example, the first conveyor belt 50 and the second conveyor belt 52 each have a width 56 between 12 inches and 53 inches.

Figure 3:
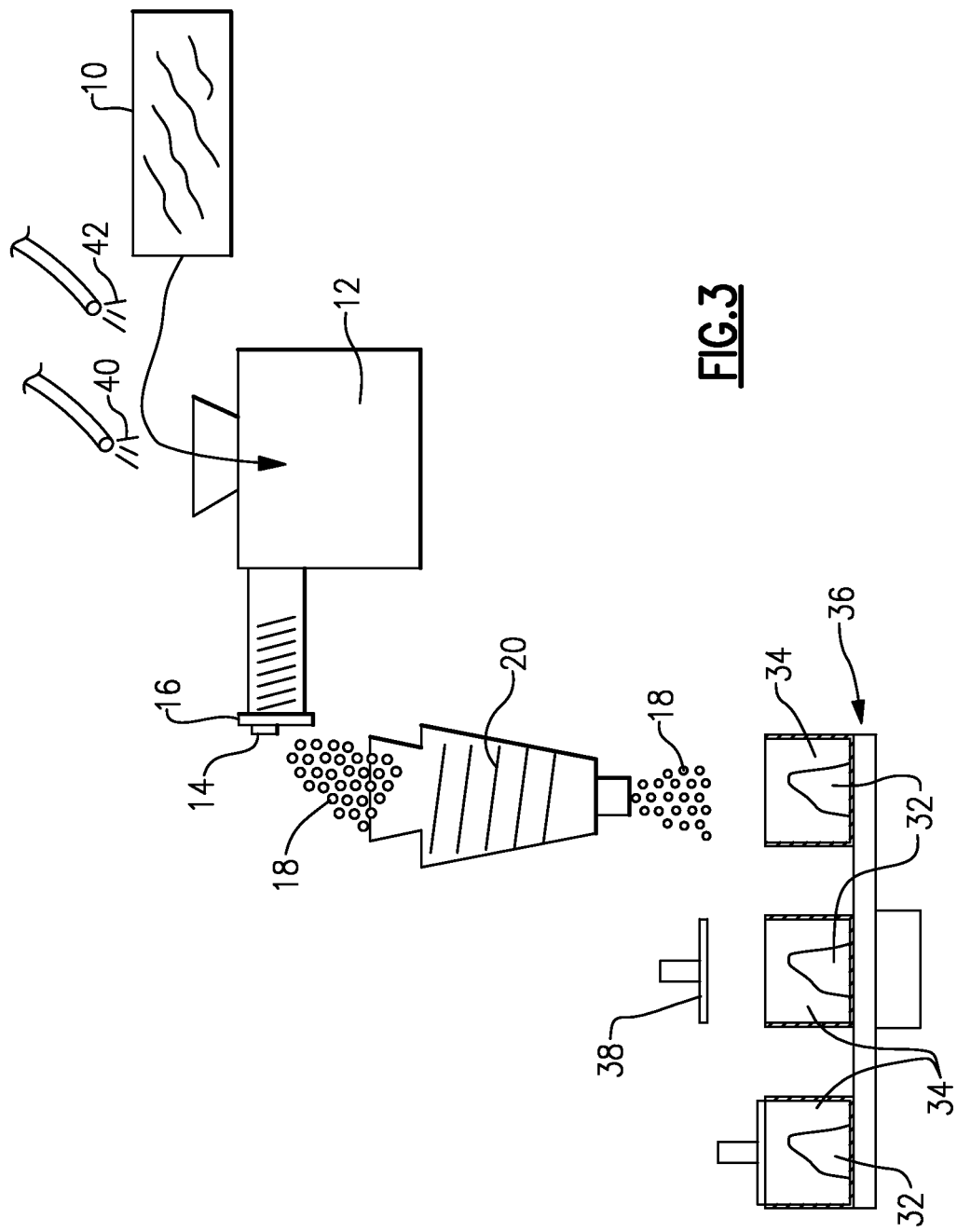
FIG. 3 is a perspective view of another example process and tooling to create biodegradable components.

Referring to FIG. 3, an example process, and corresponding tooling, to create biodegradable components and biodegradable pellets is shown. A starch-based biodegradable material 10, shown schematically, is provided. In one example, the starch-based material is mixed with water. In another example, the biodegradable material 10 is formed of a corn-based cellulosic material ("greencell") or other cellulose based material. In another example, the biodegradable material 10 is formed by providing starch flour with high amylose content and mixing the starch flour with water and additives. However, any biodegradable material may be used. ASTM International defines testing methods for determining whether a material is considered to be biodegradable.

The starch based biodegradable material 10 is provided to an extruder 12. In one example, the extruder 12 is a heated mix extruder. However, other types of extruders may be used. The extruder 12 is attached to a rotary cutter 14 and extrusion die 16 which are arranged to form a plurality of biodegradable pellets 18. In this example, the extruder 12 heats the biodegradable material 10 and forces the biodegradable material 10 through openings of the extrusion die 16. One or both of the extruder 12 and the extrusion die 16 are heated between 150° C. and 250° C.

In this example, an adhesion promoter 40, shown schematically, is added to the biodegradable material 10 in the extruder 12 or before the biodegradable material 10 is dispensed in the extruder to enhance bonding between the extruded biodegradable material 10 (in the form of biodegradable pellets 18), as will be described in further detail below. In this example, the adhesion promoter 40 is a water-soluble epoxy.

In one example a blowing agent 42, shown schematically, is added to the biodegradable material 10 in the extruder 12, or before the biodegradable material 10 is dispensed in the extruder, to cause post extrusion expansion. In one example, the blowing agent 42 is a two stage baking powder. The addition of blowing agent 42 assists in reducing openings between the plurality of biodegradable pellets 18 as they are compressed, as described in further detail below.

In another example, the blowing agent 42, for example, thermoplastic microspheres such as EXPANCEL® (AkzoNobel Pulp and Performance Chemicals AB, Sundsvall, Sweden) or a plasticizer comprising polyvinyl butadiene, which provides additional ductility and toughness in the plurality of biodegradable pellets 18, and may be designed to cause expansion from heating in a tool, as will be described in further detail below.

The biodegradable material 10 emerges from the extrusion die 16 based on the geometry and arrangement of openings of the extrusion die 16. The biodegradable material 10 expands as it emerges from the extrusion die 16.

The extruded biodegradable material 10 is cut by the rotary cutter 14, which moves about the extrusion die 16, to form the plurality of biodegradable pellets 18. The plurality of biodegradable pellets 18 may be uniformly or non-uniformly formed. The size of the plurality of biodegradable pellets 18 is determined by the size of the extrusion die 16 opening, the rate of extrusion, and the RPM of the rotary cutter 14. The length of the extruded biodegradable material 10 is cut to equal the length of the desired biodegradable pellet 18. In one example, to form round biodegradable pellets 18, the length of the cut extrusion is equal to a diameter of the expanded extruded biodegradable material 10.

In this example, the plurality of biodegradable pellets 18 are formed using the extrusion process and tooling described above. In another example, the plurality of biodegradable pellets 18 may be pre-formed by manufacture using an independent process or at a different location, and subsequently provided for further manufacture without the use of the above extrusion process and tooling.

In one example, the plurality of biodegradable pellets 18 are dispensed directly to at least one mold 30, as will be described in further detail below.

In another example, the plurality of biodegradable pellets 18 are dispensed in a tumbler 20. The plurality of biodegradable pellets 18 are tumbled in the tumbler 20 to form the plurality of biodegradable pellets 18 having a round, oval, or elliptical geometry. However, other shapes of plurality of biodegradable pellets 18 are contemplated. In one example, the plurality of biodegradable pellets 18 are tumbled while still heated to assist forming of the plurality of biodegradable pellets 18.

Round, oval, or elliptical shaped biodegradable pellets 18 provide a uniform surface and are geometrically suitable for packing in a mold, as will be described in further detail below. Round, oval, or elliptical shaped biodegradable pellets 18 generally have less surface area than other geometric shapes for packing in the mold.

In this example, the tumbler 20 is heated to a desired pre-determined temperature to shape the plurality of biodegradable pellets 18. The heated tumbler 20 tumbles the plurality of biodegradable pellets 18 at a temperature below the extrusion temperature, but at a temperature high enough such that the plurality of biodegradable pellets 18 do not adhere together in the tumbler 20, but will be able to adhere when placed in a mold, as will be described in further detail below.

After the plurality of biodegradable pellets 18 are tumbled and heated, the plurality of biodegradable pellets 18 are dispensed in at least one mold 30 to form a component. Alternatively, the plurality of biodegradable pellets 18 are dispensed in the at least one mold 30 directly after extrusion. Mold 30 may include one or more male parts 32 and female parts 34. The male parts 32 and female parts are three dimensional and formed based on a component to be shipped (not shown) or other desired shape. In this example, the plurality of biodegradable pellets 18 is dispensed based on at least one of weight or volume.

In one example, a plurality of molds 30 are disposed on a carousel 36 such that a plurality of molds 30 are rotated and provided with the plurality of biodegradable pellets 18 without adjusting the source of the plurality of biodegradable pellets 18. In this example, the number of molds 30 in the plurality of molds 30 is determined based on the number of biodegradable pellets 18 necessary for each mold 30, the type of adhesion promoter 40, and the time necessary for the plurality of biodegradable pellets 18 to settle, possibly expand, and adhere to one another in each mold 30.

In this example, the plurality of biodegradable pellets 18 are compressed in the mold 30 to form the component having performance characteristics based on one or more of the finished size of each of the plurality of biodegradable pellets 18, the finished stiffness of each of the plurality of biodegradable pellets 18, the adhesion promoter used, the finished surface porosity of each of the plurality of biodegradable pellets 18, and/or the density of biodegradable pellets 18 within a given thickness of the component.

In one example, the plurality of biodegradable pellets 18 are compressed in the mold 30 using a compression plate 38. The compression plate 38 remains in place until the plurality of biodegradable pellets 18 form a component.

In one example, the molds 30 are heated to further aide adhesion of the plurality of biodegradable pellets 18 to one another. The density of the component is determined based on the compression of the plurality of biodegradable pellets 18, the density of the pellets 18 entering the mold 30, time in the mold 30, the heat applied by the mold 30, and the amount pellet 18 expansion in the mold 30.

In one example, an adhesive, soap, glue or other material is provided in the mold 30 with the plurality of biodegradable pellets 18 to form the component.

Once the component is formed, the component may be removed from the mold 30 using ejector pins (not shown) or removal of portions of the mold 30 to allow the component to be retrieved.

The component formed using the above process and tooling has enhanced strength and moisture resistance because stress cracks are forced to follow irregular paths afforded by the plurality of biodegradable pellets 18 which are engaged with each other.

Figure 4:
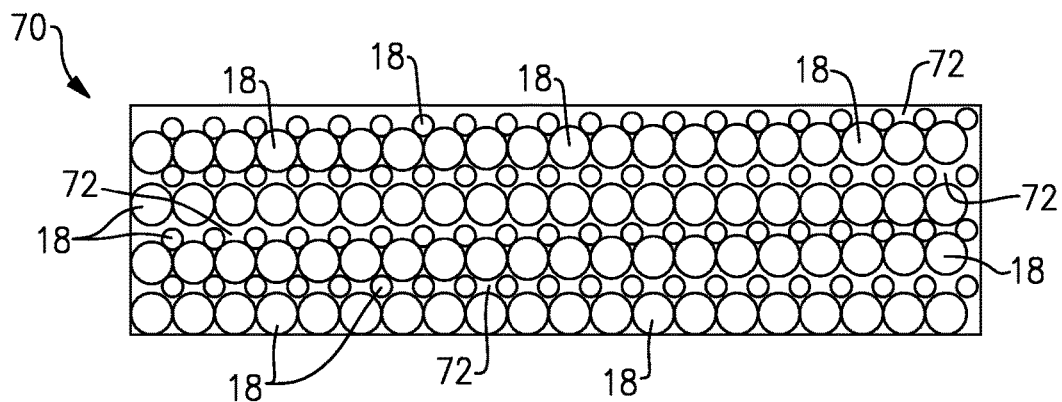
FIG. 4 is a cross-sectional view of a portion of an example component from one of the example process and tooling of FIGS. 1-3.

Referring to FIG. 4, a portion of an example component 70 formed of a plurality of biodegradable pellets 18 using any of the above processes and tooling is shown. In this example, the plurality of biodegradable pellets 18 are bonded together only at their contact points due to being exposed to reduced compressive force. A plurality of air gaps 72 are disposed between the plurality of biodegradable pellets 18 of the component 70. Although an exemplary portion is shown, example component having different geometric shapes and formations is contemplated.

Figure 5:
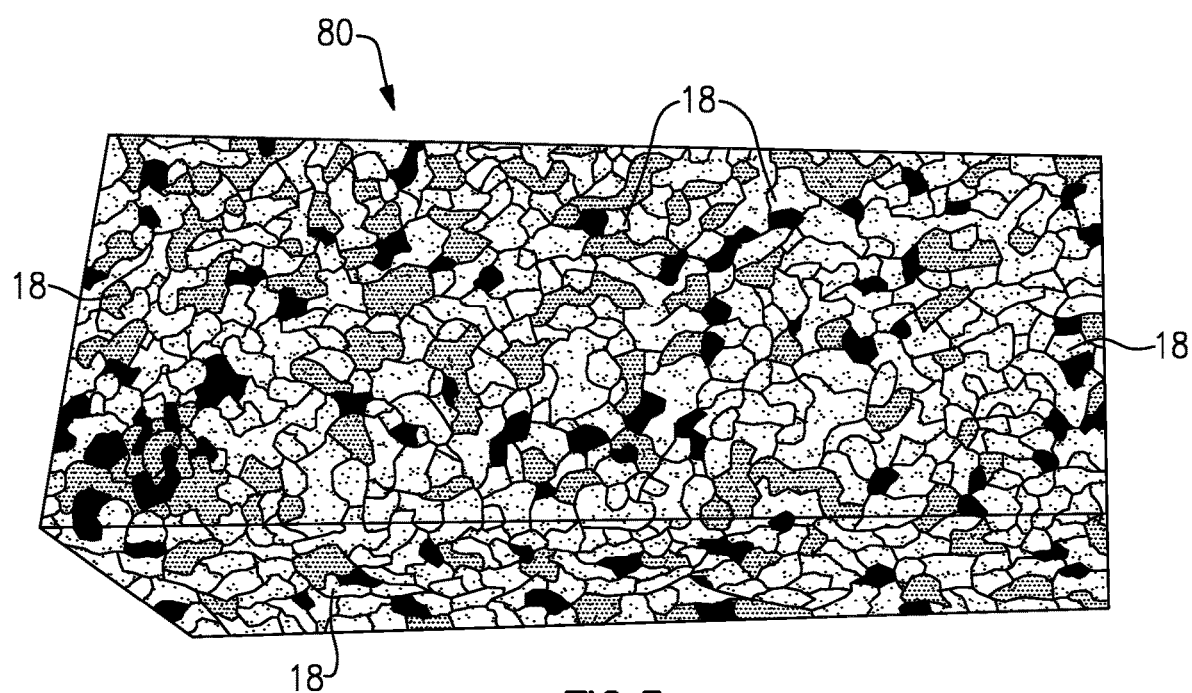
FIG. 5 is a perspective view of a portion of another example component from one of the example process and tooling of FIGS. 1-3.

Referring to FIG. 5, a portion of another example component 80 formed of a plurality of biodegradable pellets 18 using any of the above processes and tooling is shown. In this example, the plurality of biodegradable pellets 18 are bonded together and compressed such that all or substantially all of the voids between each of the plurality of biodegradable pellets 18 are removed, or the pellets 18 have expanded to fill the voids between the pellets 18. In this example, the component 80 has is more homogenous and supports strength than the example component 70 of FIG. 4. Although an exemplary portion is shown, example component having different geometric shapes and formations is contemplated.

Figure 6A:
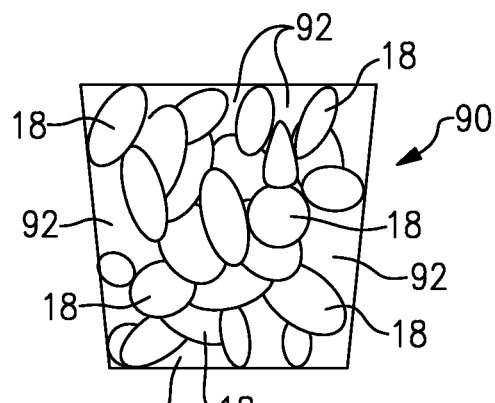
FIGS. 6A-6B show perspective views of another example component from the example process and tooling of FIGS. 1 and 3.
Figure 6B:
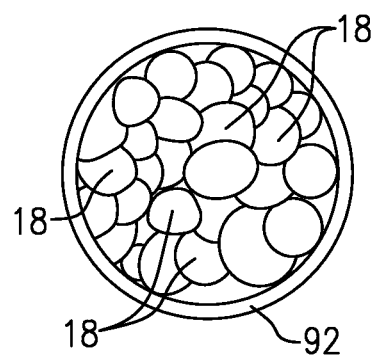
Figure 6C:
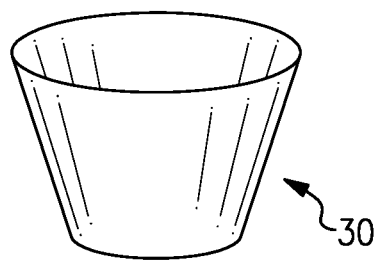
FIG. 6C is a perspective view of an example mold for the example components of FIGS. 6A-6B.

Referring to FIGS. 6A-C, an example component 90 includes the plurality of biodegradable pellets 18 floating in a soap matrix 92. In one example, the biodegradable pellets 18 range from about ⅛ inch to ⅜ inch in diameter, and the soap matrix includes a soap dust. The plurality of biodegradable pellets 18 and soap 92 are dispensed in a mold 30. In this example, the mold 30 is a cup forming a component 90 having a round cross-sectional profile. In one example, the mold 30 is made of at least one of clear acrylic, plastic, paper, and metal, alone or in combination.

Figure 7:
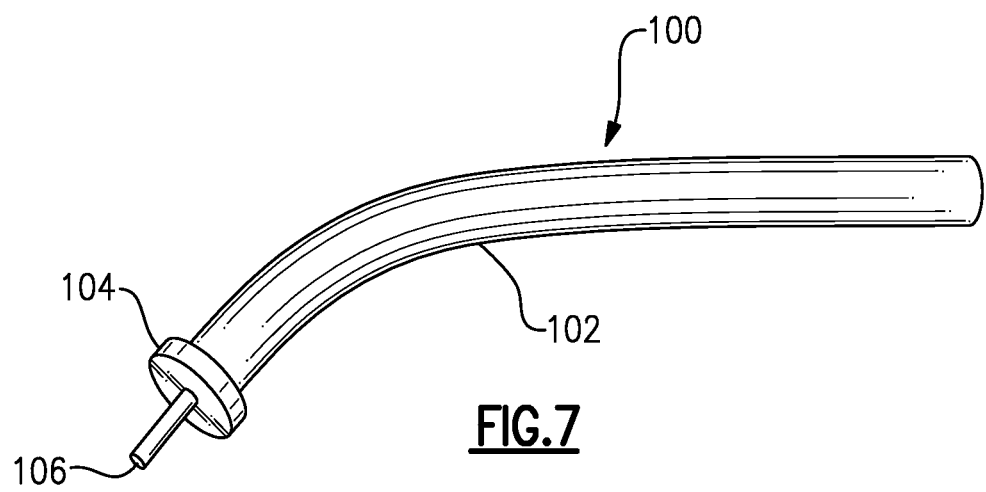
FIG. 7 is a perspective view of a tool for use with the component of FIG. 6.

Referring to FIG. 7, an example tool 100 is shown and includes a handle section 102, a seat 104, and a pin 106. The pin 106 is configured to engage the component 90 (shown in FIGS. 6A-C) to attach the component 90 to the tool 100. In one example, the pin 106 is fixed. In another example, the pin 10 is retractable. The seat 104 is attached to the handle section 102 and the pin 106 and provides a surface 108 to contact the component 90 when the pin 106 engages component 90. The tool 100 provides manual manipulation of the component 90.

Although a preferred embodiment of this disclosure has been disclosed, a worker of ordinary skill in this art would recognize that certain modifications would come within the scope of this disclosure. For that reason, the following claims should be studied to determine the true scope and content of this disclosure.

What is claimed is:

1. A starch-based material for forming a biodegradable component, comprising:
    a plurality of biodegradable pellets adhered to each other by a binding agent and each biodegradable pellet obtained from a mixture of:
        a starch having an amylose content of between about 20% and about 30% by weight, and
        0.5 to 10% by weight of an additive, wherein the additive includes 0.5 to 4% by weight of an expansion additive enhancing the physical and expansion properties of the starch, wherein the expansion additive includes heat-expandable thermoplastic microspheres, and a second additive including peat; and
    15 to 30% by weight of water, and wherein the weight percentages are based on the weight of the starch.

2. The starch-based material of claim 1, wherein the heat-expandable thermoplastic microspheres comprise a high-elongation acrylic copolymer.

3. The starch-based material of claim 1, wherein the expandable thermoplastic microspheres are at least partially or fully expanded.

4. The starch-based material of claim 1, wherein the starch-based material comprises more of the second additive material by weight than the expansion additive.

5. The starch-based material of claim 1, wherein the expansion additive is not an etherification additive.

6. A method of preparing a starch-based material for biodegradable component, the method comprising:
    mixing a starch-based material with 15 to 30% by weight of water to form a biodegradable material, wherein the starch-based material includes:
        a starch having an amylose content of between about 20% and about 30% by weight, and
        0.5 to 10% by weight of an additive, wherein the additive includes 0.5 to 4% by weight of an expansion additive enhancing the physical and expansion properties of the starch, wherein the expansion additive includes heat-expandable thermoplastic microspheres, and a second additive including peat;
    extruding the biodegradable material through a die, dividing the extruded biodegradable material to form a plurality of biodegradable pellets; and applying a binding agent onto the plurality of biodegradable pellets wherein the plurality of biodegradable pellets are adhered to each other by the binding agent, wherein the weight percentages are based on the weight of the starch.

7. The method of claim 6, wherein the method further comprises:
compressing the biodegradable pellets with the binding agent in a mold to form a biodegradable component corresponding to a geometry of the mold.

8. The method of claim 6, wherein the heat-expandable thermoplastic microspheres are at least partially or fully expanded.

* * * * *